US005215507A

United States Patent [19]

Bönig

[11] Patent Number: 5,215,507
[45] Date of Patent: Jun. 1, 1993

[54] PLANET GEAR DEVICE FOR GRASPING ARTICLES HAVING AXIAL SYMMETRY

[75] Inventor: Albert Bönig, Mülheim, Fed. Rep. of Germany

[73] Assignee: Mannesmann Aktiengesellschaft, Dusseldorf, Fed. Rep. of Germany

[21] Appl. No.: 847,907

[22] Filed: Mar. 9, 1992

[30] Foreign Application Priority Data

Mar. 8, 1991 [DE] Fed. Rep. of Germany ....... 4107931

[51] Int. Cl.[5] ........................ B23B 31/16; B25J 15/10

[52] U.S. Cl. ...................................... 475/331; 279/33; 294/106; 901/39

[58] Field of Search .................... 74/16, 813 R, 813 L, 74/826; 414/751; 901/39; 294/901, 106; 475/331; 279/33, 110

[56] References Cited

U.S. PATENT DOCUMENTS

| | | | |
|---|---|---|---|
| 1,056,435 | 3/1913 | Mead | 279/33 |
| 1,149,148 | 9/1915 | Miller | 279/110 X |
| 2,613,564 | 10/1952 | Walraven et al. | 279/33 X |
| 2,627,195 | 2/1953 | Sporket | 279/33 X |
| 2,723,861 | 11/1955 | Eisler | 279/106 |
| 3,245,279 | 4/1966 | Baker | 475/331 |
| 4,598,942 | 7/1986 | Shum et al. | 294/106 |
| 4,652,204 | 3/1987 | Arnett | 414/751 |
| 4,701,100 | 10/1987 | Nagai et al. | 414/751 |
| 4,808,898 | 2/1989 | Pearson | 901/39 X |
| 4,828,276 | 5/1989 | Link et al. | 294/106 X |

FOREIGN PATENT DOCUMENTS

| | | | |
|---|---|---|---|
| 250889 | 10/1987 | Netherlands | 901/39 |
| 1255430 | 9/1986 | U.S.S.R. | 901/39 |
| 1341022 | 9/1987 | U.S.S.R. | 901/39 |

*Primary Examiner*—Rodney H. Bonck
*Assistant Examiner*—Ryan W. Massey
*Attorney, Agent, or Firm*—Cohen, Pontani, Lieberman, Pavane

[57] ABSTRACT

A device for the grasping, moving and/or turning of articles having axial symmetry, preferably round and/or tubular articles, consisting of a drive unit and a plurality of gripper elements connected with it which are each arranged on a pivotally movable part the parts being movable together with the gripper elements either annularly in the same direction and simultaneously concentrically towards the center or in likewise manner towards the outside. In order to provide a device for the dependable grasping and moving of articles having axial symmetry, preferably round and/or tubular articles, which, upon central grasping, makes possible also the turning of the article grasped, the gripper element (18, 19, 20, 41) is fastened in the outer edge region of a planet wheel (11, 12, 13) of a planet gearing mechanism which has at least two planet wheels and one sun wheel (10) and that the planet wheels (11, 12, 13) and the sun wheel (10) and frame are arranged on a shaft (16) which is connected to the drive unit (6).

8 Claims, 5 Drawing Sheets

Fig.5
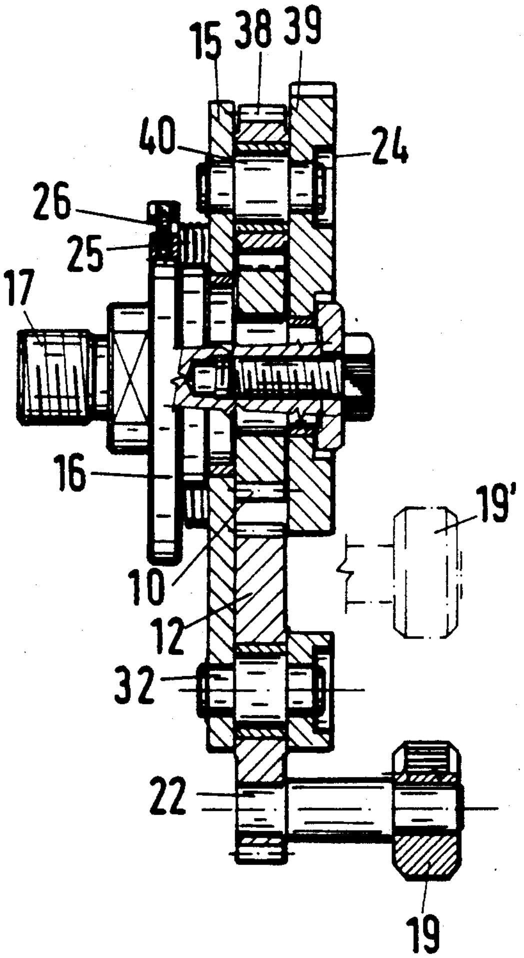
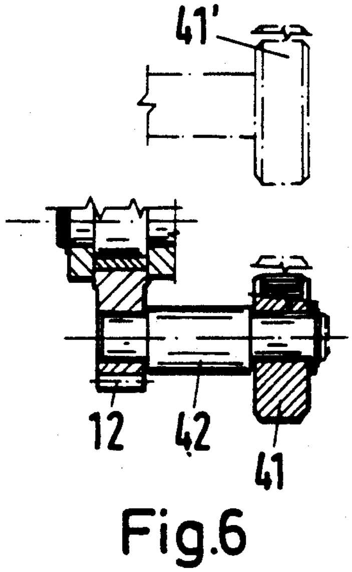
Fig.6

PLANET GEAR DEVICE FOR GRASPING ARTICLES HAVING AXIAL SYMMETRY

FIELD OF THE INVENTION

The present invention relates to a device for grasping, moving and/or turning articles having axial symmetry, preferably round and/or tubular articles, consisting of a drive unit and a plurality of gripper elements connected with it, each of which is arranged on a separate swingable part, the parts being movable together with the gripper elements either annularly in the same direction and simultaneously concentrically towards the center, or in the same way towards the outside.

BACKGROUND OF THE INVENTION

Federal Republic of Germany Patent No. DE 29 51 094, expressly incorporated herein by reference, relates to a gripper for the grasping, moving and/or transporting of preferably round and/or tubular articles. This known gripper has a plurality of gripper elements which grip the article on the inside and/or outside surfaces thereof and are mounted for rotation on a frame by external levers. The mounting pins of the external levers are fastened in a rotationally fixed manner, to an inner lever, which is connected by a gearing mechanism with a setting member connected with a drive unit in such a manner that all of the gripper elements are movable either annularly in the same direction and simultaneously concentrically towards the center of the gripper or, in likewise manner, towards the outside. With this gripper device it is possible, for example, to grip at several locations on its inside or outside surface of a ring heated to a forging temperature and transport it. It is essential, in this connection, in view of the deformability and stiffness of the workpiece to be gripped, that the number of gripper elements be as large as possible. The larger number of grippers, in such a case more uniformly distribute a gripping force.

The device of DE 29 51 094 presents the disadvantage that the stop surface of the device on the body to be gripped is eccentric so that dependable grasping of the body simultaneously by all gripper elements is not assured, since an oblique position of the device is not excluded. Furthermore, the article gripped cannot be turned by the gripper mechanism according to DE 29 51 094.

OBJECTS OF THE INVENTION

It is an object of the present invention to provide a device for the dependable gripping and moving of articles of axial symmetry, preferably round and/or tubular articles which, by central grasping, permits in both turning and grasping of an article by a manipulating mechanism.

It is another object of the present invention to provide a device for grasping, moving and/or turning articles of axial symmetry, preferably radially symmetric round and/or tubular articles, consisting of a drive unit and a plurality of gripper elements connected to the drive unit, each of which is arranged on a separate swingable or pivotally mounted part, the parts being movable together with the gripper elements either annularly in the same direction and simultaneously concentrically towards the center, or annularly in the same direction and simultaneously concentrically towards the outside. The gripper element (18–20, 41) in each case is fastened in the outer edge region of a planet wheel (11–13) of a planet gearing mechanism having at least two planet wheels and one sun wheel (10), and the planet wheels (11–13) and the sun wheel (10) being rotatably mounted in a frame and the sun wheel (10) and frame are arranged on a shaft (16) which is connected to the drive unit (6).

It is another object of the present invention to provide a planet gear device for grasping articles having axial symmetry, comprising a drive unit having an output shaft, a frame, a sun wheel rotatably mounted in said frame and connected to said output shaft, a plurality of planet wheels having an outer edge and being pivotally mounted in said frame for rotation with respect to said sun wheel, and a plurality of gripper elements, each of said gripper elements being arranged on said outer edge of a separate one of said planet wheels, said planet wheels being pivotable together with said gripper elements such that said gripper elements move through an annular path concentrically and simultaneously in the same direction upon a rotation of said shaft.

It is another object of the present invention to provide such a device in which a part (14, 39) of the frame which faces the gripper elements (18–20, 41) is provided with a central part and at least two arms (28–30) extending therefrom, in the end region of which arms, the corresponding planet wheel (11–13) is mounted. In such an embodiment, the arms may be bent and the bend of the arms (28–30) so shaped that the region of swing of the gripper elements (18–20, 41) is limited to, at most, 180°.

It is another object of the present invention to provide the aforementioned embodiments in combination with a planet gearing mechanism which has three or more planet wheels (11–13).

It is yet another object of the present invention to provide a device in which the gripper element (18–20) is firmly connected to a holding bolt (21–23) which is arranged on the planet wheel (11–13).

It is still a further object of the present invention to provide a device in which the gripper element (41) is mounted rotatably and eccentrically on a holding bolt (42) which is fastened on the planet wheel (11–13).

Another object of the invention is to provide a device in which, between the sun wheel (10) and each of the planet wheels (11–13) bearing the gripper elements (18–20, 41), is arranged an intermediate wheel (36–38) which provides an opposite direction of rotation of the planet wheels (11–13).

It is a still further object of the present invention to provide a device according to the aforementioned embodiments in which a flexible coupling (8) is arranged between hydraulic motor (6) and planetary gearing.

A further object of the invention is to provide a device in which the drive unit is a hydraulic motor (6) or electric motor, the direction of rotation of which can be reversed.

According to another object of the invention, one of the planet wheels (11–13) is connected to the end (27) of a spring (25) which can be tensioned in the clamping direction.

A still further object of the present invention is to provide a device according to the aforementioned embodiments having a drive unit (6) which is flanged onto a holding frame (1) which is axially (5.1) displaceable on a bottom plate (2). In this embodiment, the holding frame (1) may be arranged on a table which is connected to the bottom plane (2), be axially (5.1) displaceable, and be adjustable in height (5.2).

All of these object and others will be apparent from the summary and detailed description of the invention.

SUMMARY OF THE INVENTION

The device of the present invention has the advantage that, as compared with the prior art, the article grasped can, when grasped centrally, also be turned about an axis or rotation. In accordance with the invention, for this purpose, the corresponding gripper element is fastened in the region of the outer edge of a planet wheel of a planet gearing mechanism having at least two planet wheels and one sun wheel. After the gripper elements come to rest against the surface of the article to be moved, the grasped article is turned by further rotation of the sun wheel. By the rotation of the planet wheels, the gripper elements are moved concentrically, so that, on the one hand, a force lock, i.e. frictional linkage, or a form lock, i.e. mechanical interfitting linkage, is assured between the article and the gripper elements. Further, this arrangement assures the capacity for bridging over of large dimensions, to provide a large span. The central arrangement of the frame, holding the sun wheel and the planet wheels on a shaft which, together with the drive unit, is fastened on a holding frame, permits the precise parallel, axial displacement of the device. An oblique position of the device with respect to the axis of the article to be grasped is thus avoided. The range of dimensions to be spanned over by the gripper elements depends on the diameter of the planet wheel and the distance of the holding bolt for the gripper element from the point of rotation of the planet wheel, as well as on the range of swing or pivotal movement of the gripper elements. The central region can be further increased if the part of the frame facing the gripper elements has bent arms rather than straight arms. The angle of swing is at most 180° when the bend of the arms is so selected that the stop surface of the arm, which limits the range of swing of the holding bolt, and thus also of the gripper element attached thereto, is at a distance from the connecting line between planet wheel pivot point (axis of rotation) and sun wheel pivot point, which is equal to half the diameter of the holding bolt.

In the presently described embodiment, the closing movement and thus the direction of clamping of the gripper elements is opposite the direction of rotation of the sun wheel and of the article to be turned. Thus, the clamping action may be enhanced by rotational movement. With certain dimensions of the article to be turned with respect to the spanning dimension of the device, the gripper elements may slip on the surface of the grasped article after the closing movement, so that the article thus cannot be turned. This dimensional limitation depends primarily on the direction of the frictional moment with respect to the direction of the closing movement. When the condition is satisfied that the outer diameter OD of the article to be grasped is equal to or greater than twice the distance $D_{PP}$ between the pivot point of the sun wheel and the pivot point of the plant wheel, then the moment of friction supports the clamping action of the gripper elements.

$$OD \geqq 2 \times D_{PP}$$

In the case of an article having an outside diameter which is smaller than the defined distance, the direction of the frictional moment changes so that it opposes the clamping action. This consideration applies both to the external clamping and to the internal clamping, and is independent of the direction of rotation of the sun wheel. Such a design has the result that, with production of a frictional moment which supports the clamping action, the range of dimensions to be spanned becomes small, since only the distance from the planet wheel turning point to the surface point of the gripper element present on the inside on the diameter axis is available. This distance becomes particularly large when the diameter of the sun wheel is very small and thus the diameter of the planet wheel, with unchanged center point distances, becomes very large, the holding bolt is arranged entirely outside on the planet wheel and the diameter of the gripper element is small.

In order to make optimal use of the device of the present invention for additional diameter ranges, another embodiment provides an intermediate wheel which changes the direction of rotation of the planet wheel, in each case between the sun wheel and the planet wheel bearing the gripper elements. In this case, the direction of rotation of the driving sun wheel is equal to the direction of rotation of the planet wheels and thus also to the closing movement of the gripper elements. With this arrangement, the direction of the frictional moment which supports the clamping action coincides with the closing movement when the condition is satisfied that the outer diameter OD of the article to be turned is equal to or less than the distance $D_{PP}$ from the pivot point of the sun wheel to the pivot point of the planet wheel.

$$OD \leqq 2 \times D_{PP}$$

This condition also applies both for the outer clamping and for the inner clamping and is independent of the direction of rotation of the sun wheel.

Regardless of the manner of implementation of the device, i.e. whether with or without intermediate wheels, the clamping action is supported if the gripper elements are mounted eccentrically and turnably on the holding bolt. With such an arrangement, pressure is exerted on the article to be turned by the increasing distance between pivot point and point of action, and thus the clamping action is accordingly increased.

For the greatest universal use and broadest applicability of the two aforementioned embodiments described, the arms of the frame which bear the planet wheels must be straight, so that turning of the gripper elements to the right or left is possible. In this way, the field of use however is somewhat limited since the maximum range of swing of the gripper elements is then less than 180°. If this range of swing, however, is to be fully utilized, the arms must have a bend so that the holding pin can swing into the recess thereby produced. In this way, however, the direction of turning is fixed for the gripper element and a change in the direction of rotation is possible only by replacement of this part of the frame.

As a drive unit for the gripper of the present invention, there is preferably employed a hydraulic motor which can easily be adjusted and is easily protected from overload. Other systems, such as electrical motors may also be employed. For better compensation for possible angular inaccuracies of the axis of the planet gearing and of the turning article, a flexible coupling is preferably arranged between the drive unit and the planet gearing.

The device according to the present invention can be used for various purposes, including turning articles on a support in order to bring them into a suitable machining position, turning articles to be cooled or turning to screw or loosen parts on the article closing or covering the end region of the article. Thus, for instance, it is common practice in the case of threaded pipes to screw a protective cap on the threaded region on the pipe ends so that the threaded region will not be damaged during transport or handling. These protective endcaps are ordinarily screwed on by hand, which requires personnel for manual labor for a period corresponding to the shift time. This activity may be strenuous, and cause repetitive strain injuries of the wrists, due to the constantly recurring movement.

Since the device of the present invention is designed for the grasping of the article from the inside or outside, corresponding protective parts can also be screwed into or out of an internal thread. In order to limit the turning movement of the sun wheel after the screwing on of the protective part, the hydraulic motor is preferably adjusted to a predetermined end load value. When this end load value is reached, the motor automatically disconnects. A similar functionality may, of course, also be obtained with an electric motor and corresponding sensors. Alternatively, the drive may be connected to a timing device for controlling a time cycle and to turn the drive off after a predetermined time.

The loosening of the gripper elements of the present invention takes place in very simple manner. Release may be performed by reversing the direction of rotation of the hydraulic motor, so that the gripper elements are moved again into the end position. As an alternative, another embodiment connects the end of a spring which can be tensioned in the direction of rotation, with one of the planet wheels, so that upon the disconnecting or deactivating of the motor, the tensioned spring causes a rearward rotation, thus causing the gripper elements to lift off from the article.

The aforementioned possible examples of use for the device of the invention were directed to the cases of articles having a round cross section. However, articles of square or rectangular cross section can also be grasped and turned, as long as the condition of axial *symmetry is satisfied, and the number and placement of the gripper elements is adapted to correspond to the shape and size of the articles. Thus, for instance, it is possible, in the case of an article having a square cross section, to use two or four gripper elements. A larger number of gripper elements is possible, but is not considered advantageous since the planet gearing is very expensive and the dimensions of the device increase accordingly.

The entire device can be transported for different fields of use since the holding frame bearing the drive motor and the planet gearing, including the coupling, is arranged to be axially displaceable on a bottom plate. By means of a suitable guide, the displacement of the gripper elements may be ensured to take place precisely parallel to the axis of the article. Furthermore, another embodiment of the present invention has an arrangement wherein the holding frame is on a table, which is furthermore adjustable in height, so that a paraxial adjustment of the device with respect to the article is possible.

The axial displacement of the device is limited because that side of the frame part facing the gripper elements, which lies in the direction of the article, is developed as a stop surface. Since the stop surface is distributed symmetrically over the circumference, canting and thereby non-uniformly grasping the article are prevented. Furthermore, the stop surface is necessary so that the internal friction of the planet gearing is overcome by the normal force acting on the end surface of the article at the start of the rotation of the sun wheel, and the gripper elements are then moved in the clamping direction.

BRIEF DESCRIPTION OF THE DRAWING

The preferred embodiments are shown by way of example in the accompanying drawings in which:

FIG. 5 is a section along the line A–B of FIG. 4; and

FIG. 6 shows, in section, another embodiment of the gripper element of the present invention.

DETAILED DESCRIPTION OF THE PRESENTLY PREFERRED EMBODIMENTS

Figure 1:
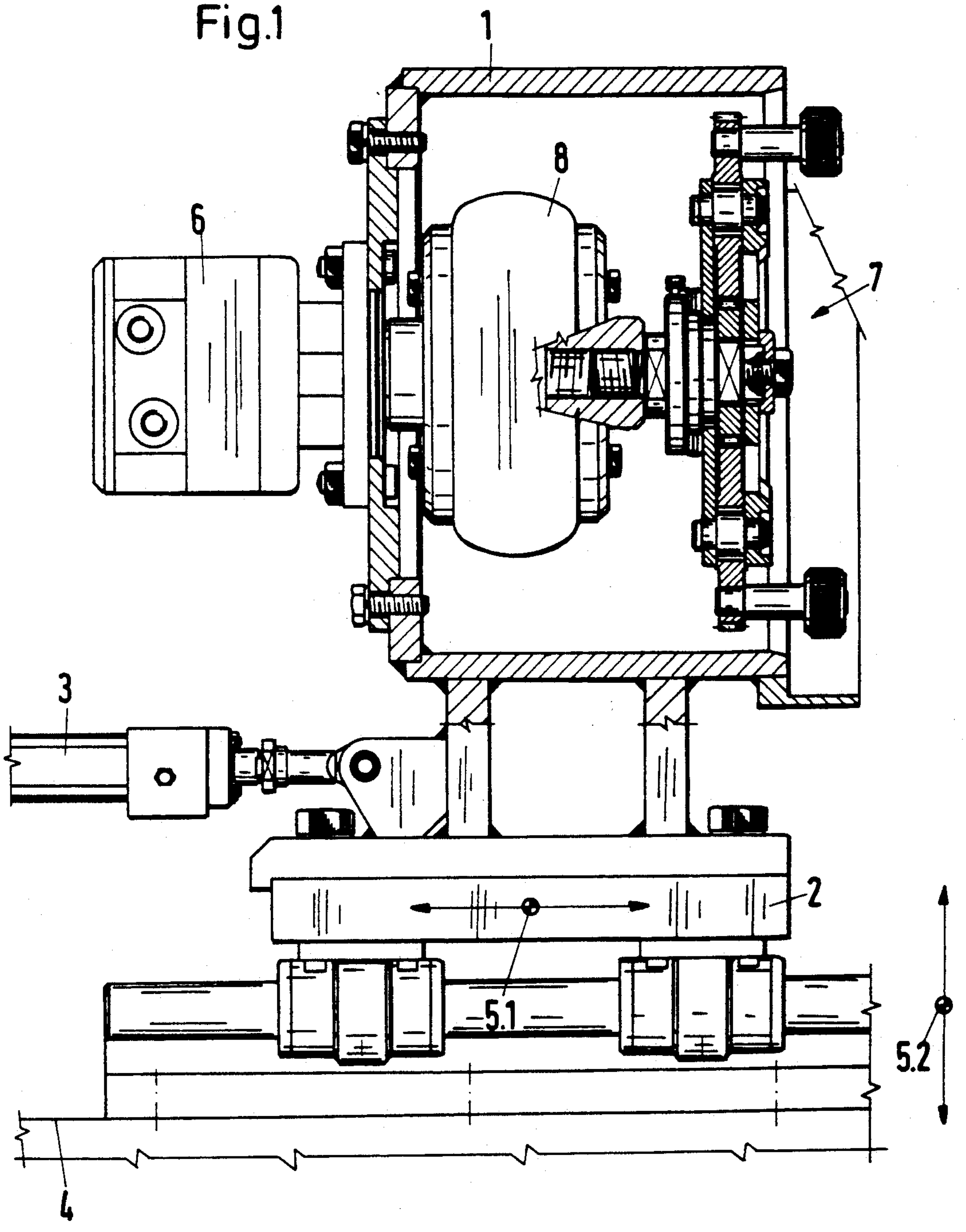
FIG. 1 shows the device of the present invention in longitudinal section.

The device of the present invention consists of a holding frame 1, which is arranged on a base plate 2 and is displaceable axially along a bottom plate 4, by means of a piston-cylinder unit 3. The axial displacement is indicated by the arrow 5.1 and the possibility of vertical displacement is indicated by the arrow 5.2. On the rear, closed end of the holding frame 1, the drive unit 6, is mounted by flanges, the drive unit 6 in this embodiment being an adjustable hydraulic motor. The connection between drive unit 6 and actual gripper device 7 is made vie a flexible coupling 8, in order to be able to compensate for possible angular deviation in the axial positions between gripper device 7 and the article being rotated.

Figure 2:
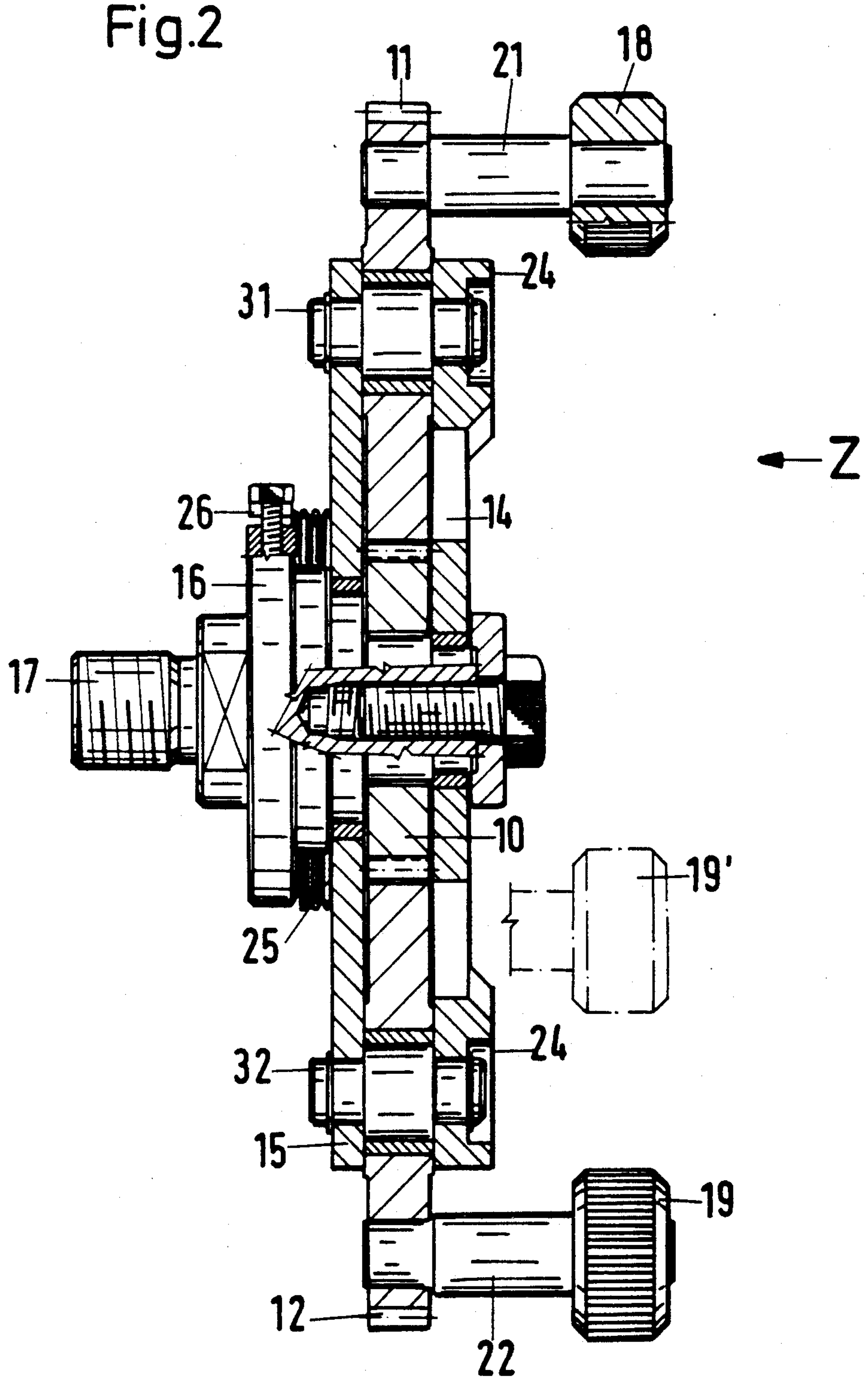
FIG. 2 shows the actual gripping device of the present invention on a larger scale in section along the line A–B of FIG. 3.
Figure 3:
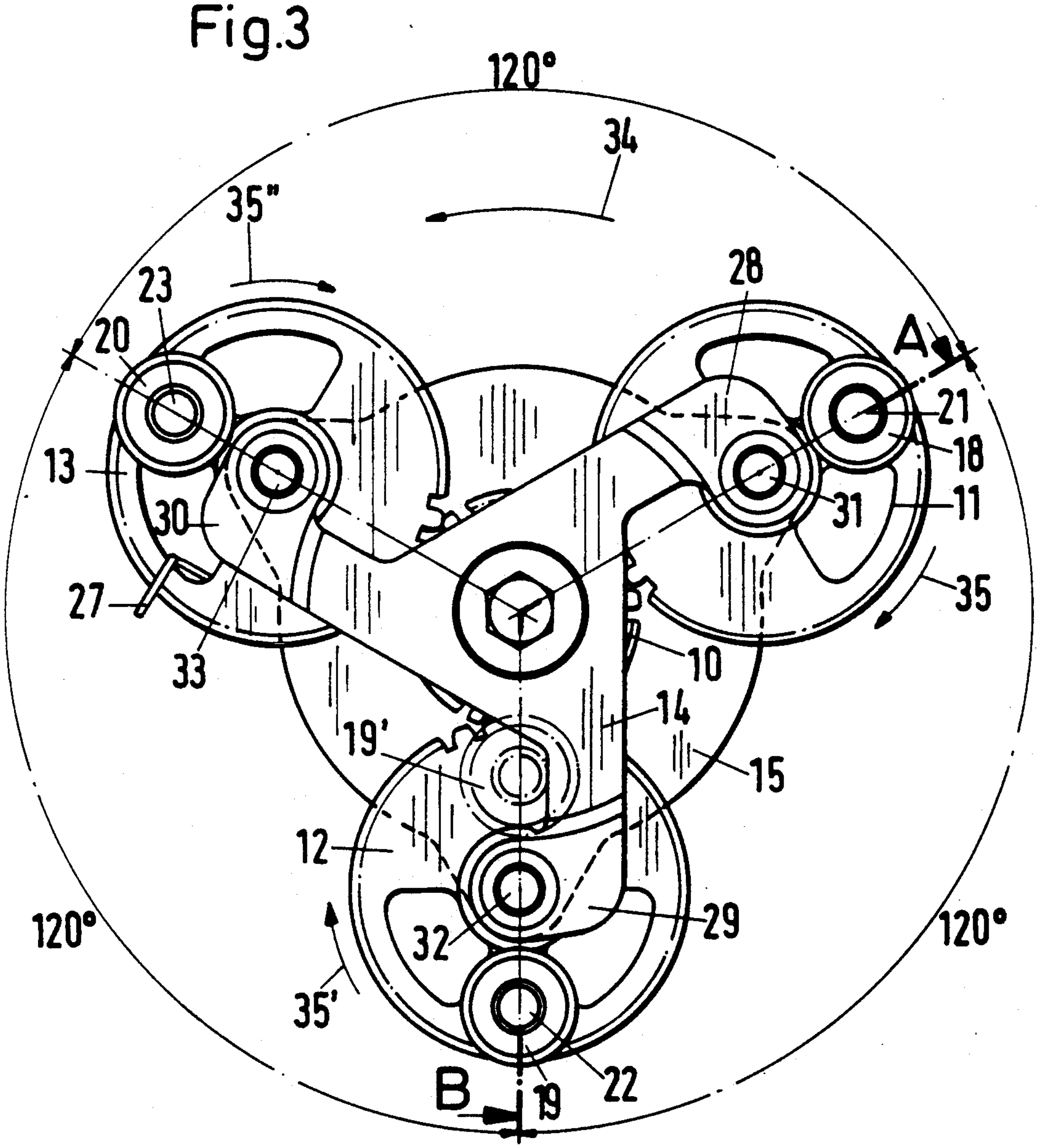
FIG. 3 is a view in the direction Z of FIG. 2.

The details of the gripper device 7 of the present invention are shown on a larger scale in FIG. 2, which is a section along the line A–B of FIG. 3. The gripper device 7 has a planet gearing mechanism consisting of a sun wheel 10 and three planet wheels 11, 12, 13, the gearing mechanism being held between two frame parts 14, 15. The frame parts 14, 15 and the planet gearing mechanism rest on a multiple stepped down shaft 16 which, via its threaded pin 17, is fastened in the flexible coupling 8 (see FIG. 1). In each of the outer regions of the planet wheels 11, 12, 13, a gripper element 18, 19, 20 is arranged firmly on a holding bolt 21, 22, 23. The connection of the gripper elements 18, 19, 20 with the holding bolts 21, 22, 23 can be effected, for instance, by bonding. Of course, other known methods may be used in this regard. In the position shown in FIGS. 2 and 3, the gripper elements 81, 19, 20 are fully open, while the dashed line showing of the one gripper element 19 in FIG. 2 shows the end position 19' after a swing through 180°.

That side of the one frame part 14 which faces the article to be turned is developed as stop surface 24. This is necessary so that a frictional lock, which is greater than the internal friction of the planet gearing, is obtained with a corresponding force on the end surface of the article to be gripped and turned.

In order to facilitate opening of the gripper elements 18, 19, 20 after the turning or rotating of the gripped article, a spring 25, which can be tensioned in the clamping direction, is arranged on the rear of the frame part 15 facing away from the object. One end 26 of the spring is fastened on the shaft 16 and the other end 27 on one of the planet gears 13. As an alternative to the spring 25, the turning direction of the drive unit 6 can also be reversed in order to be able to open the gripper elements 81, 19, 20 again.

FIG. 3 is a view of the gripper device 7 of the present invention, seen in the direction "Z" shown in FIG. 2. This figure demonstrates the construction of the frame part 14 of the frame which faces the gripper elements 18, 19, 20. This frame part 14 has a central part and bent arms 28, 29, 30 extending from it, on the ends of which arms the planet wheels 11, 12, 13 are mounted by means of bolts 31, 32, 33. A direction of rotation of the sun wheel 10 is indicated by the arrow 34, while the arrows 35, 35',35" indicate the corresponding direction of rotation of the planet wheels 11, 12, 13. The closing movement of the gripper elements 18, 19, 20 takes place also in the same direction of rotation. The end position 19' of a gripper element 19, after a swing of 180°, is shown as a dashed line for gripper element 19.

Figure 4:
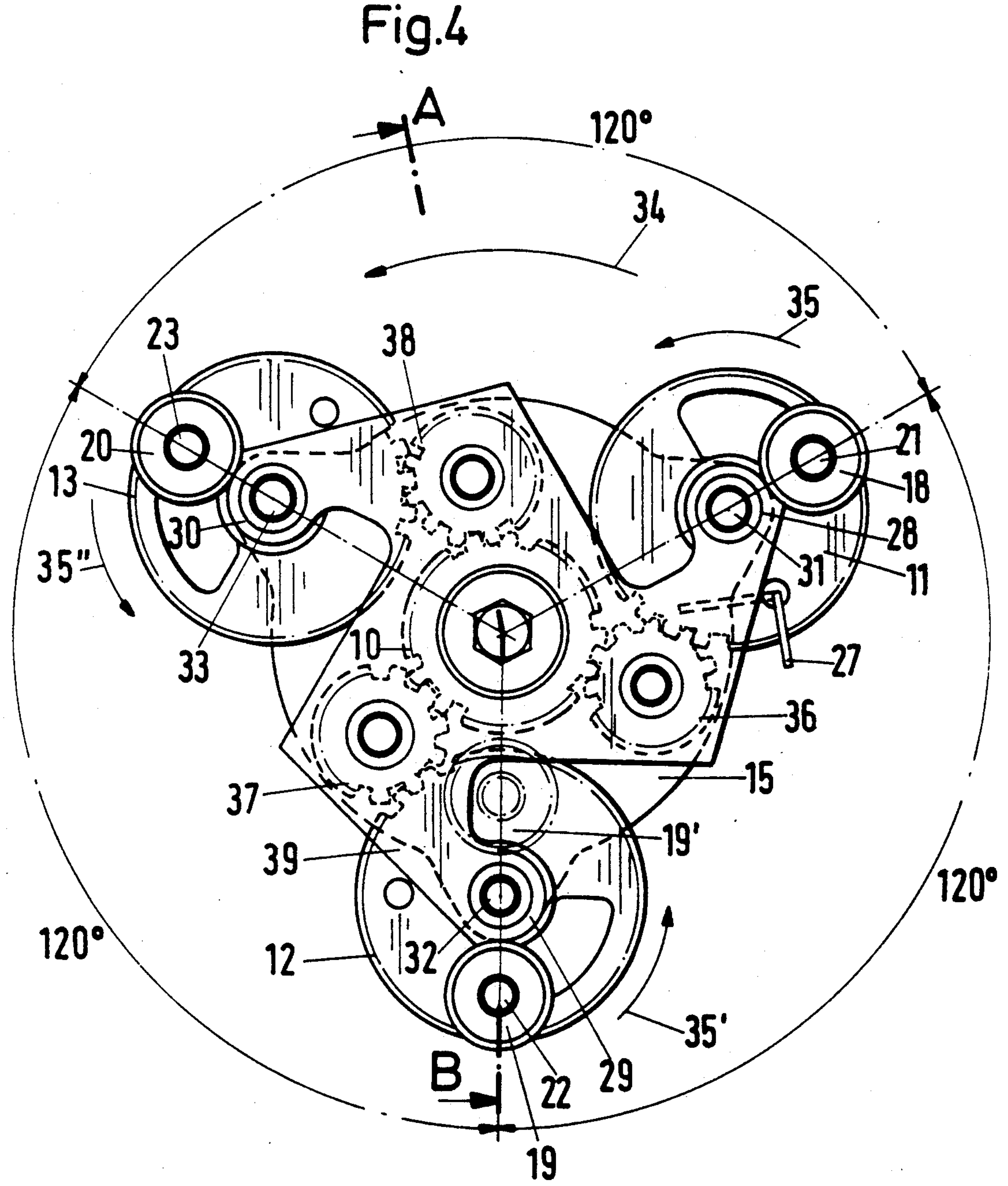
FIG. 4 is a view of another embodiment of the present invention in the direction Z in FIG. 5.

FIG. 4 shows, in the same view as FIG. 3, a different embodiment of the gripper device 7 of the present invention. In this case, the same reference numerals have been used for the same parts. This embodiment also has a sun wheel 10 and three planet wheels 11, 12, 13, having within their outer edge regions the gripper elements 18, 19, 20. FIG. 4 differs from FIG. 3, however, in that intermediate wheels 36, 37, 38 are arranged between sun wheel 10 and planet wheels 11, 12, 13, in order to change the direction of rotation. These intermediate wheels 36, 37, 38, are mounted on the frame part 39 facing the article to be gripped, which is also modified in construction as compared with the embodiment in accordance with FIG. 3. The range of motion of the gripper elements is limited to a maximum of 180°, like in FIG. 3, as can be noted from the end position 19' of the gripper element 19, shown as a dashed line. Another, but not essential difference from the showing in FIG. 3, is that the end 27 of the spring 25 is fastened to another planet wheel 11. The arrows 34, 35, 35', 35" indicate that in this embodiment the direction of rotation of the sun wheel 10 is the same as the direction of rotation of the planet wheels 11, 12, 13 and thus also of the gripper elements 18, 19, 20.

FIG. 5 shows the embodiment of the present invention which has already been described above in a partial cross section along the line A–B in FIG. 4. The arrangement of the intermediate wheel 38 between the two frame parts 15, 39 can be readily noted in this figure.

FIG. 6 shows another embodiment of the gripper elements of the present invention. FIG. 6 differs from FIGS. 1 to 5 in that the gripper elements 41 (in this case, only one gripper element is shown by way of example) are mounted eccentrically and rotatably on the holding bolt 42. The end position 41' of the gripper element 41 after a swing of 180° is shown in dash-dot lines.

The present invention claims priority from German Patent Application No. P 41 07 931.0, filed Mar. 8, 1991, the entirety of which is expressly incorporated herein by reference.

It should be understood that the preferred embodiments and examples described are for illustrative purposes only and are not to be construed as limiting the scope of the present invention which is properly delineated only in the appended claims.

What is claimed is:

1. A planet gear device for grasping and turning articles having axial symmetry, the device comprising a rotatable frame having two frame portions mounted on a shaft, a drive motor connected to the shaft, the direction of rotation of the drive motor being reversible, a planet gearing mechanism mounted between the frame portions, the planet gearing mechanism comprising a sun wheel connected to the shaft, and at least three planet wheels, each planet wheel having an outer edge and being mounted for rotation with respect to the sun wheel, a holding bolt attached to each planet wheel at the outer edge thereof, an essentially disk-shaped gripper element rotatably mounted on each holding bolt, so that a rotation of the sun wheel moves the gripper elements concentrically and simultaneously in the same direction, wherein one of the frame portions faces the gripper elements, the frame portion facing the gripper elements having a central part and a plurality of arms extending therefrom, the arms having a radially outer region, the plane wheels being mounted in the outer regions of the arms, wherein the drive motor and the planet gearing mechanism are mounted on a holding frame.

2. The device according to claim 1, wherein said arms are bent and have such shape that a range of pivotal rotation of said gripper elements on said planet wheels is at most 180°.

3. The device according to claim 1, further comprising a plurality of intermediate wheels rotatably mounted to said frame between said sun wheel and each of said planet wheels, for reversing a relative direction of rotation of said planet wheels with respect to said sun wheel.

4. The device according to claim 3, wherein the sun wheel and the planet wheels each have an axis, a distance being defined between the axis of the sun wheel and the axis of each planet wheel, and wherein a frictional moment of the device supporting a clamping action of the gripping elements relative to an article to be grasped and turned coincides with a closing movement of the gripping elements when an outer diameter of the article to be grasped and turned is one of equal to and smaller than the distance between the axis of the sun wheel and the axis of each planet wheel.

5. The device according to claim 1, further comprising a flexible coupling arranged between said drive motor and said sun wheel.

6. The device according to claim 1, wherein said device has a clamping direction, further comprising a return spring capable of being tensioned in said clamping direction, the return spring having an end, said end being linked to one of said planet wheels.

7. The device according to claim 1, further comprising a bottom plate, the holding frame being mounted horizontally displaceable on said bottom plate, a flange mounted to said holding frame, said drive motor being mounted at said flange to said holding frame.

8. The device according to claim 1, wherein the sun wheel and the planet wheels each have an axis, a distance being defined between the axis of the sun wheel and the axis of each planet wheel, and wherein a frictional moment of the device supporting a clamping action of the gripping elements relative to an article to be grasped and turned coincides with a closing movement of the gripping elements when an outer diameter of the article to be grasped and turned is one of equal to and greater than twice the distance between the axis of the sun wheel and the axis of each planet wheel.

* * * * *